US008224624B2

(12) United States Patent
Cherkasova et al.

(10) Patent No.: US 8,224,624 B2
(45) Date of Patent: Jul. 17, 2012

(54) USING APPLICATION PERFORMANCE SIGNATURES FOR CHARACTERIZING APPLICATION UPDATES

(75) Inventors: Ludmila Cherkasova, Sunnyvale, CA (US); Ningfang Mi, Williamsburg, VA (US); Mehmet Kivanc Ozonat, Mountain View, CA (US); Julie A. Symons, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 12/250,748

(22) Filed: Oct. 14, 2008

(65) Prior Publication Data

US 2010/0094592 A1    Apr. 15, 2010

Related U.S. Application Data

(60) Provisional application No. 61/048,157, filed on Apr. 25, 2008.

(51) Int. Cl.
*G21C 17/00* (2006.01)
*G06F 11/30* (2006.01)

(52) U.S. Cl. .......... 702/182; 702/85; 702/183; 709/223; 709/224

(58) Field of Classification Search .............. 702/81–85, 702/127, 182, 183; 703/2; 709/223, 224; 713/153; 714/45; 380/180, 251; 370/230, 370/352, 509
See application file for complete search history.

(56) References Cited

U.S. PATENT DOCUMENTS

| | | | |
|---|---|---|---|
| 6,587,878 B1 | 7/2003 | Merriam | |
| 6,601,098 B1 | 7/2003 | Case et al. | |
| 6,701,363 B1* | 3/2004 | Chiu et al. | 709/224 |
| 6,731,600 B1 | 5/2004 | Patel et al. | |
| 6,928,280 B1 | 8/2005 | Xanthos et al. | |
| 7,088,706 B2 | 8/2006 | Zhang et al. | |
| 7,333,517 B2 | 2/2008 | Madhavapeddi et al. | |
| 2002/0167942 A1 | 11/2002 | Fulton | |
| 2003/0028779 A1* | 2/2003 | Rowe | 713/180 |
| 2003/0097557 A1* | 5/2003 | Tarquini et al. | 713/153 |
| 2004/0111510 A1 | 6/2004 | Shoaib et al. | |
| 2005/0177344 A1 | 8/2005 | Khaleel | |
| 2006/0168594 A1 | 7/2006 | Deverill et al. | |
| 2007/0073873 A1 | 3/2007 | Levy et al. | |
| 2007/0214261 A1* | 9/2007 | Kikuchi et al. | 709/224 |
| 2009/0031022 A1* | 1/2009 | Wexler et al. | 709/224 |
| 2009/0307347 A1* | 12/2009 | Cherkasova et al. | 709/224 |

OTHER PUBLICATIONS

Raj Jain, "The Art of Computer Systems Performance Analysis: Techniques for Experimental Design Measurement Simulation and Modeling," Sep. 1991, pp. 570-579, John Wiley & Sons, New York, NY.
Final Office Action dated Mar. 30, 2011, U.S. Appl. No. 12/251,245, filed Oct. 14, 2008.
Office Action dated Dec. 10, 2010, U.S. Appl. No. 12/251,245, filed Oct. 14, 2008.
Office Action dated Oct. 26, 2011, U.S. Appl. No. 12/251,245, filed Oct. 14, 2008.
Final Office Action dated May 16, 2012, U.S. Appl. No. 12/251,245, filed on Oct. 14, 2008.

* cited by examiner

*Primary Examiner* — John H Le

(57) ABSTRACT

One embodiment is a method that determines application performance signatures occurring at an application server in a multi-tier architecture. The method then analyzes the application performance signatures to determine whether a change in transaction performance at the application server results from a modification to an application.

20 Claims, 6 Drawing Sheets

USING APPLICATION PERFORMANCE SIGNATURES FOR CHARACTERIZING APPLICATION UPDATES

CROSS-REFERENCE TO RELATED APPLICATIONS

This application claims the benefit of U.S. Provisional Patent Application Ser. No. 61/048,157, filed Apr. 25, 2008 and titled "Using Application Performance Signatures For Characterizing Application Updates."

BACKGROUND

Application servers are a core component of a multi-tier architecture that has become the industry standard for building scalable client-server applications. A client communicates with a service deployed as a multi-tier application through request-reply transactions. A typical server reply consists of the web page dynamically generated by the application server. The application server can issue multiple database calls while preparing the reply. As a result, understanding application level performance is a challenging task.

Significantly shortened time between new software releases and updates makes it difficult to perform a thorough and detailed performance evaluation of an updated application. The problem is how to efficiently diagnose essential performance changes in the application performance and to provide fast feedback to application designers and service providers.

Additionally, an existing production system can experience a very different workload compared to the one that has been used in testing environment. Furthermore, frequent software releases and application updates make it difficult to perform an accurate performance evaluation of an updated application, especially across all the application transactions.

DETAILED DESCRIPTION

Figure 1:
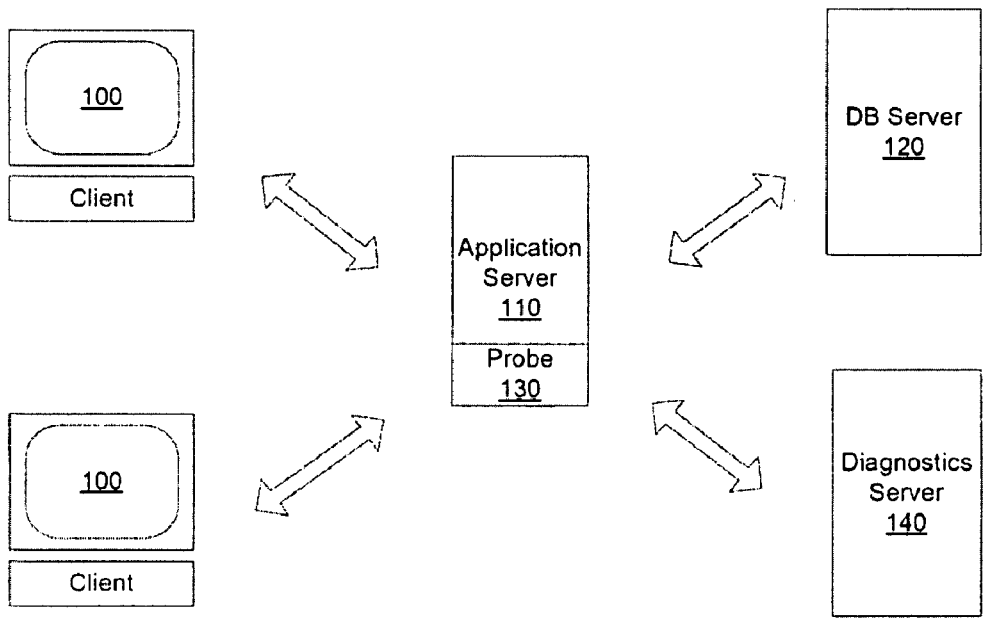
FIG. 1 is a multi-tier architecture with a diagnostics tool in accordance with an exemplary embodiment of the present invention.

Exemplary embodiments in accordance with the present invention are directed to systems and methods for using application signatures to analyze performance of an application executing in an application server of a multi-tier architecture. The application signatures are used to determine whether transaction latencies are caused by an update to the application or changes in workload at the application server.

Exemplary embodiments are based on an application signature that enables a quick performance comparison of a new application signature against an old application signature while the application continues its execution in a production environment. Comparing the new application signature against the old one allows detection of specific application performance changes and enables further analysis to determine whether these are intended and acceptable performance changes.

The application signature approach provides a simple and powerful diagnostics solution that can be used for efficient capacity planning and provisioning of multi-tier applications in rapidly evolving Information Technology (IT) environments. Such an application signature is representative and stable under different workload characteristics. Further, if there is a change in transaction execution time after a software update to an application, then the new application signature will reflect this change.

The application signature provides a model of normal application behavior. In one embodiment, online performance modeling is part of routine application monitoring and is useful for performance debugging, capacity planning, and anomaly detection. Exemplary embodiments provide a quick and efficient performance analysis of application transactions while the application is executing in the production environment. Additionally, exemplary embodiments monitor date exchanged to and from the application server without being intrusive to the multi-tier architecture.

One embodiment provides a thorough and detailed performance evaluation of an updated application after a new software release or update is implemented in the system. Exemplary embodiments diagnose changes in the application performance after the update and provide fast feedback to application designers and service providers. Transaction latencies caused by updates or changes in the software are detected and used to evaluate performance of the updated application.

One embodiment is an automated monitoring tool that tracks transaction activity and breaks down transaction latencies across different components and tiers in multi-tiered systems. By way of example, automated tools in accordance with exemplary embodiments divide latency into server-side latency and database-side latency. Analysis of this latency is useful in performance evaluation, debugging, and capacity planning, to name a few examples.

Exemplary embodiments are described in the context of multi-tier architectures for developing scalable client-server applications. Exemplary embodiments design effective and accurate performance models that predict behavior of multi-tier applications when they are placed in an enterprise production environment and operated under real workload mix.

FIG. 1 is a multi-tier architecture with a diagnostics tool in accordance with an exemplary embodiment of the present invention. For discussion purposes, exemplary embodiments are described in the context of a multi-tier e-commerce web-site that simulates the operation of an on-line retail site, such as a bookstore. A three-tier architecture is shown wherein client computers or users navigate to an internet website and make transaction requests to one or more application servers and databases.

In a three-tier architecture for an application, the application comprises the following three tiers: (1) an interface tier (sometimes referred to as the web server or the presentation tier), (2) an application tier (sometimes referred to as the logic or business logic tier), and (3) a data tier (e.g. database tier). There are also plural client computers 100 that communicate with the multiple tiers and provide a user interface, such as a graphical user interface (GUI), with which the user interacts with the other tiers. The second tier is shown as an application server 110 that provides functional process logic. The application tier can, in some implementations, be multi-tiered itself (in which case the overall architecture is called an "n-tier architecture"). For example, the web server tier (first tier) can reside on the same hardware as the application tier (second tier). The third tier is shown as a database server 120 and manages the storage and access of data for the application. In one embodiment, a relational database management system (RDBMS) on a database server or mainframe contains the data storage logic of the third tier.

In one embodiment, the three tiers are developed and maintained as independent modules (for example, on separate platforms). Further, the first and second tiers can be implemented on common hardware (i.e., on a common platform), while the third tier is implemented on a separate platform. Any arrangement of the three tiers (i.e., either on common hardware or across separate hardware) can be employed in a given implementation. Furthermore, the three-tier architecture is generally intended to allow any of the three tiers to be upgraded or replaced independently as requirements, desires, and/or technology change.

One embodiment extracts logs with a diagnostic tool. This diagnostic tool collects data from the instrumentation with low overheads and minimum disruption to the transaction. By way of example, the tool provides solutions for various applications, such as J2EE applications, NET applications, ERP/CRM systems, etc.

In one embodiment, the diagnostics tool consists of two components: a diagnostics probe 130 in the application server 110 and a diagnostics server 140. The diagnostics tool collects performance and diagnostic data from applications without the need for application source code modification or recompilation. It uses byte code instrumentation and industry standards for collecting system and Java Management Extensions (JMX) metrics. Instrumentation refers to byte code that the diagnostic probe inserts into the class files of application as the applications are loaded by the class loader of a virtual machine. Instrumentation enables the probe 130 to measure execution time, count invocations, retrieve arguments, catch exceptions and correlate method calls and threads.

The diagnostic probe 130 is responsible for capturing events from the application, aggregating the performance metrics, and sending these captured performance metrics to the diagnostics server 140. In a monitoring window, the diagnostics tool provides one or more of the following information for each transaction type:

(1) A transaction count.
(2) An average overall transaction latency for observed transactions. The overall latency includes transaction processing time at the application server 110 as well as all related query processing at the database server 120, i.e., the latency is measured from the moment of the request arrival at the application server to the time when a prepared reply is sent back by the application server 110 (see FIG. 2).
(3) A count of outbound (database) calls of different types.
(4) An average latency of observed outbound calls (of different types). The average latency of an outbound call is measured from the moment the database request is issued by the application server 110 to the time when a prepared reply is returned back to the application server, i.e., the average latency of the outbound call includes database processing and the communication latency.

One exemplary embodiment implements a Java-based processing utility for extracting performance data from the diagnostics server 140 in real-time. This utility creates an application log that provides complete information on all the transactions processed during the monitoring window, their overall latencies, outbound calls, and the latencies of the outbound calls.

Assuming that there are totally M transaction types processed by the application server 110, the following notations are used:

(1) T=1 min is the length of the monitoring window;
(2) $N_i$ is the number of transactions $Tr_i$, i.e., i-th type, where $1 \leq i \leq M$;
(3) $R_i$ is the average latency of transaction $Tr_i$;
(4) $P_1$ is the total number of types of outbound DB calls for transaction $Tr_i$;
(5) $N_{i,j}^{Db}$ is the number of DB calls for each type j of outbound DB call for transaction $Tr_i$, where $1 \leq j \leq P_i$;
(6) $R_{i,j}^{DB}$ is the average latency for each type j of outbound DB call, where $1 \leq j \leq P_i$;
(7) $U_{CPU,n}$ is the average CPU utilization at the n-tier during this monitoring window (e.g., n=2 for TPC-W).

The specific types of different transactions vary according to the system. For a retail website, such transactions types include, but are not limited, client requests during browsing, clicking on a hyperlink, adding items to a shopping cart, retrieving detailed information on a particular product, checking out after selecting items to purchase, etc.

Table 1 shows a fragment of the extracted application log for a 1-minute time monitoring window.

TABLE 1

| time | $N_1$ | $R_1$ | ... | $N_M$ | $R_M$ | $N_{1,J}^{DB}$ | $R_{1,J}^{DB}$ | ... | $N_{1,Pi}^{DB}$ | $R_{1,Pi}^{DB}$ | ... | $U_{CPU}$ |
|---|---|---|---|---|---|---|---|---|---|---|---|---|
| 1 min | 28, | 4429.5 | ... | 98, | 1122.9 | 56, | 1189.7 | ... | 28, | 1732.2 | ... | 8.3% |
| 2 min | | | ... | ..., | ... | | ..., | | ... | ... | ... | ... |

If the solution has multiple application servers in the configuration then there are multiple diagnostics probes installed at each application server. Further in one embodiment, each probe independently collects data at these application servers supported by, for example, heterogeneous machines with different CPU speeds. Data processing is done for each probe separately.

Figure 2:
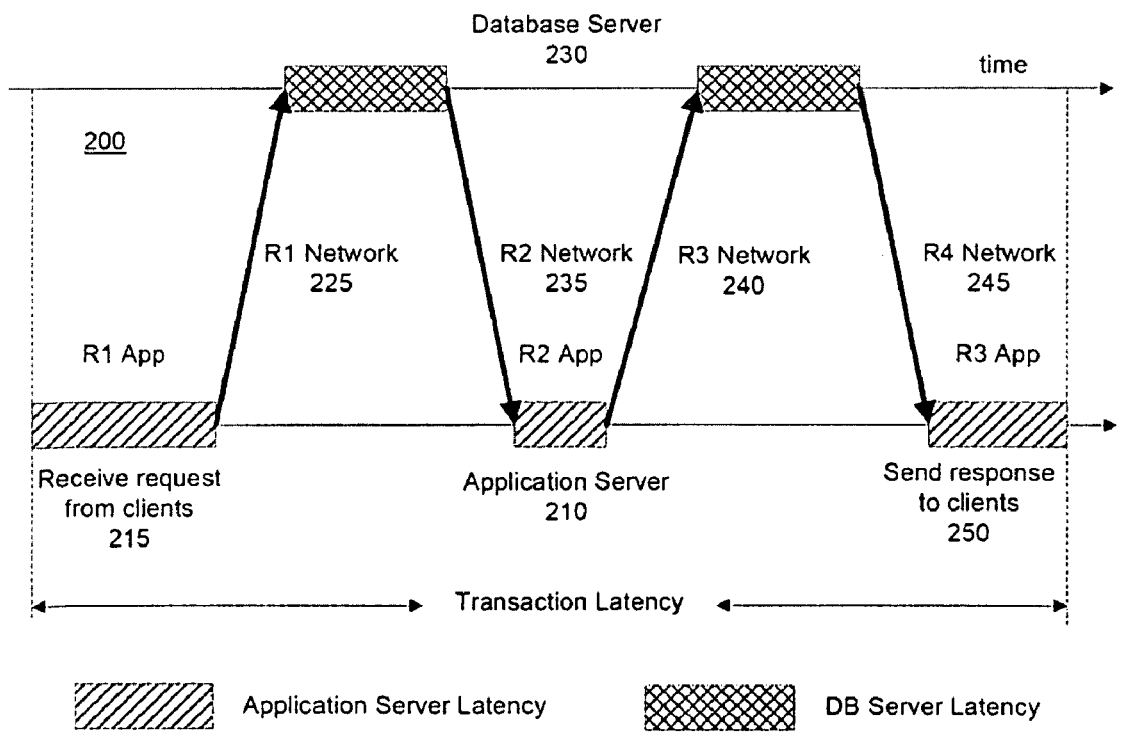
FIG. 2 is diagram showing transaction latency measured by a diagnostics tool in accordance with an exemplary embodiment of the present invention.

FIG. 2 is diagram 200 showing transaction latency measured by the diagnostics tool in accordance with an exemplary embodiment of the present invention. The application server 210 receives a request from clients 215. This request (R1 App) is routed over a network (R1 network 225) to the database server 230. The database server processes the request and transmits a response (R2 network 235) over the network and back to the application server 210. Here, the application server processes the response and transmits a request (R3 network 240) back to the database server 230 for processing. In turn, the database server 230 transmits the response (R4 network 245) over the network to the application server 210. This response is sent to the client 250.

As shown in FIG. 2, transaction latencies accumulate at various stages between the time the request is received and the time the response is provided to the client. The overall latency includes transaction processing tine at the application server 110 (FIG. 1) as well as all related query processing at the database server 120 (FIG. 1). In one embodiment, the latency is measured from the moment of the request arrival at the application server 215 to the time when a prepared reply is sent back to the clients 250.

While it is useful to have information about current transaction latencies that implicitly reflect the application and system health, such information provides limited insight into the causes of the observed latencies and cannot be used directly to detect the performance changes of an updated or modified application introduced into the system.

Figure 3:
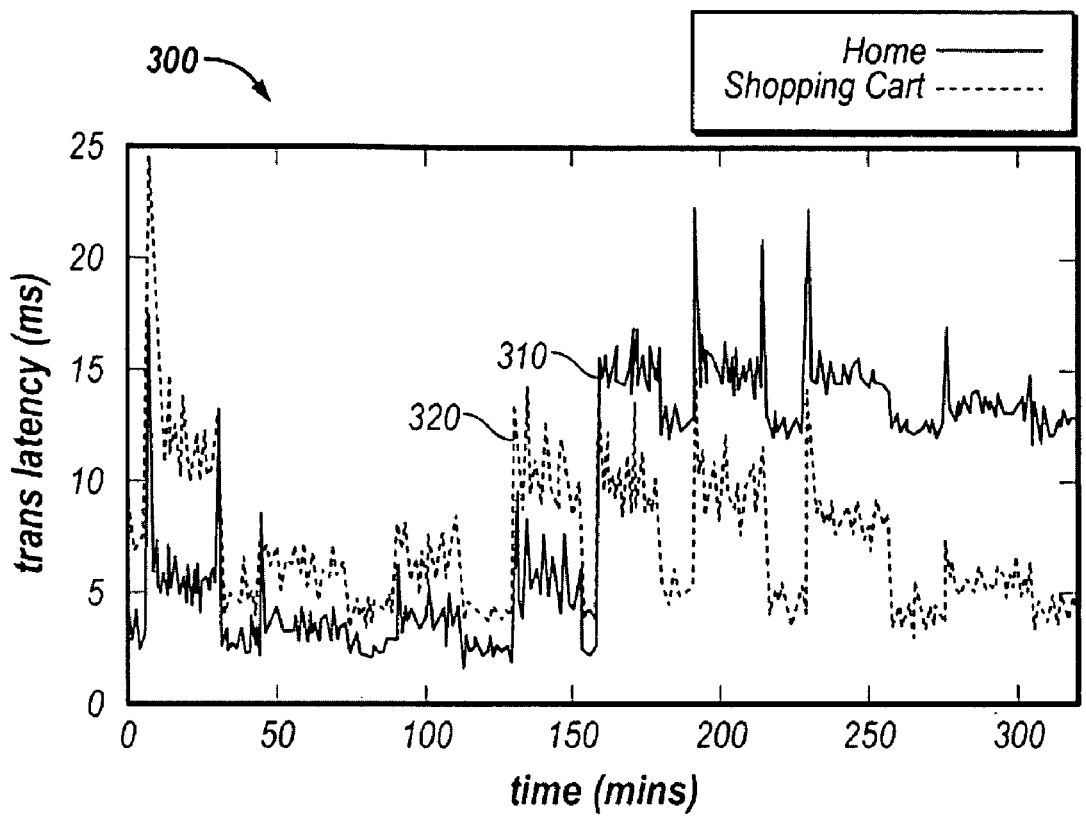
FIG. 3 shows a graph of transaction latencies for two transactions over time in a multi-tier architecture in accordance with an exemplary embodiment of the present invention.

FIG. 3 shows a graph 300 of transaction latencies for two transactions over time in a multi-tier architecture in accordance with an exemplary embodiment of the present invention. Specifically, two transactions "home" 310 and "shopping cart" 320 are shown for about 300 minutes. The latencies of both transactions vary over time and get visibly higher in the second half of the graph 300. This increase in latency, however, does not look suspicious because the increase can be a simple reflection of a higher load in the system (i.e., a greater number of transactions being simultaneously being processed).

After timestamp 160 min, one embodiment began executing an updated version of the application code where the processing time of the home transaction 310 is increased by 10 milliseconds. By examining the measured transaction latency over time, one cannot detect the cause of this increase since the reported latency metric does not provide enough information to detect this change. Exemplary embodiments, however, provide methods for determining the cause of this transaction latency increase shown in graph 300. By using measured transaction latency and its breakdown information, exemplary embodiments process and present the latency to quickly and efficiently diagnose essential performance changes in the application performance and to provide fast feedback to application designers and service providers.

Figure 4:
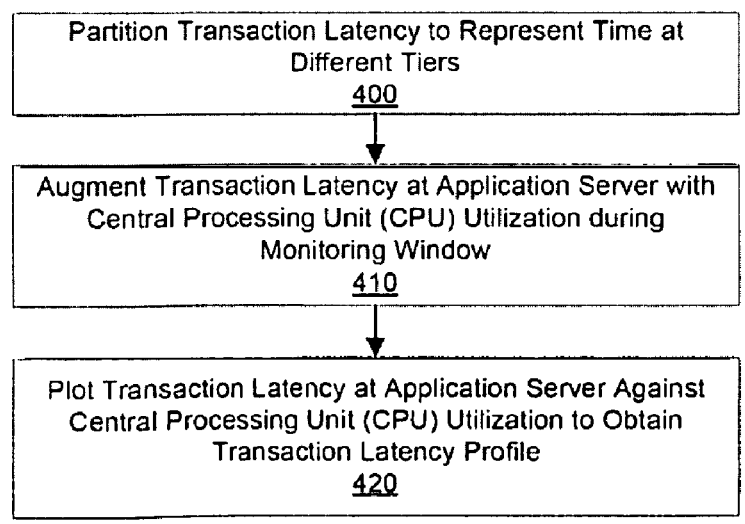
FIG. 4 is a flow diagram for obtaining the transaction latency profile in accordance with an exemplary embodiment of the present invention.

FIG. 4 is a flow diagram for obtaining the transaction latency profile in accordance with an exemplary embodiment. As used herein and in the claims, the term "transaction latency profile" means plotting, measuring, or determining a measured transaction latency of one or more transactions against the system load or CPU utilization in a multi-tier architecture with an application server making requests to a database server.

According to block 400, the transaction latency is partitioned into complimentary portions that represent time spent at different tiers of the multi-tier architecture. For example, the transaction latencies are divided between latencies at the front or application server (i.e., second tier) and the database server (i.e., the third tier).

According to block 410, the transaction latency at the application server is augmented with the Central Processing Unit (CPU) utilization of the application server measured during the same monitoring window.

According to block 420, the transaction latency at the application server is plotted against the CPU utilization. The graph of this plot provides a representative transaction latency profile. This transaction profile is similar under different transaction mixes. In other words, it is uniquely defined by the transaction type and CPU utilization of the server and is practically independent of the transaction mix.

The transaction latency includes both the waiting time and the service times across the different tiers (e.g., the front server and the database server) that a transaction flows through.

For discussion, $R_i^{front}$ and $R_i^{DB}$ are the average latency for the i-th transaction type at the front and database servers respectively. Exemplary embodiments discover $R_i^{front}$ because this value represents the latencies that are occurring as a result of the application (as opposed to latencies occurring at the database server). Although $R_i^{front}$ shows the latency at the application server, this value is not static but depends on current load of the system.

The transaction latency is calculated as follows:

$$R_i = R_i^{front} + R_i^{DB}$$
$$= R_i^{front} + \left(\sum_{j=1}^{P_i} N_{i,j}^{DB} * R_{i,j}^{DB}\right)/N_i$$

Using this equation, exemplary embodiments calculate $R_i^{front}$. Then, for each transaction $Tr_i$, exemplary embodiments generate 100 CPU utilization buckets $\{U_i^1=1, U_i^2=2 \ldots, U_k^i=k, \ldots, U_{100}^i=100\}$.

Using extracted application logs, for each one minute monitoring window, exemplary embodiments classify observed transactions into the corresponding CPU utilization buckets. For example, if during the current monitoring window there are $N_i$ transactions of type i with average latency $R_i^{front}$ under observed CPU utilization of 10% at the application server, then a pair ($N_i$, $R_i^{front}$) goes in the CPU utilization bucket $U_{10}^1$. Finally, for each CPU bucket $U_k$, exemplary embodiments compute average latency $R_{i,k}^{front}$ and overall transaction count $N_{i,k}$.

For each transaction $Tr_i$, exemplary embodiments create a transaction latency profile in the following format: [$U_k$, $N_{i,k}$, $R_{i,k}^{front}$]. Here, $1 \leq i \leq M$ and $1 \leq k \leq 100$. In each CPU bucket, exemplary embodiments store information on overall transaction count $N_{i,k}$ because this information is used in assessing whether the bucket is representative.

Figure 5:
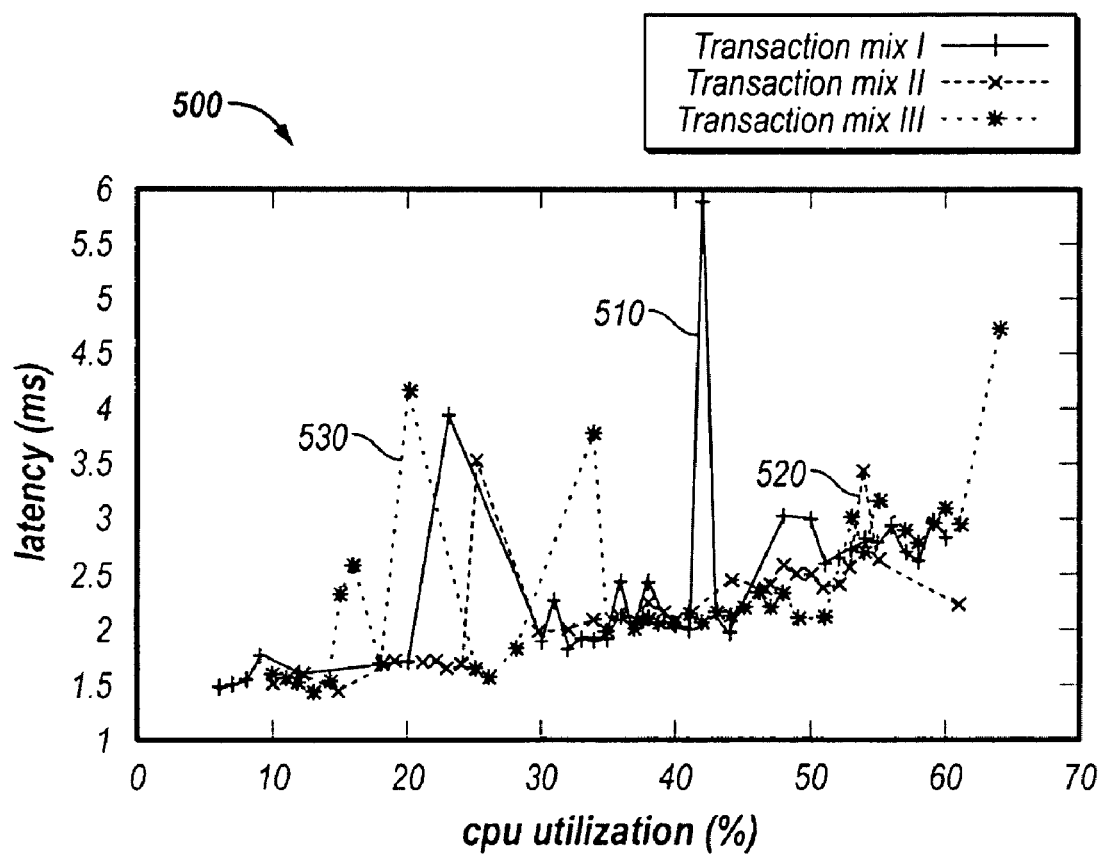
FIG. 5 shows a graph of a home transaction latency profile for three workloads in accordance with an exemplary embodiment of the present invention.
Figure 6:
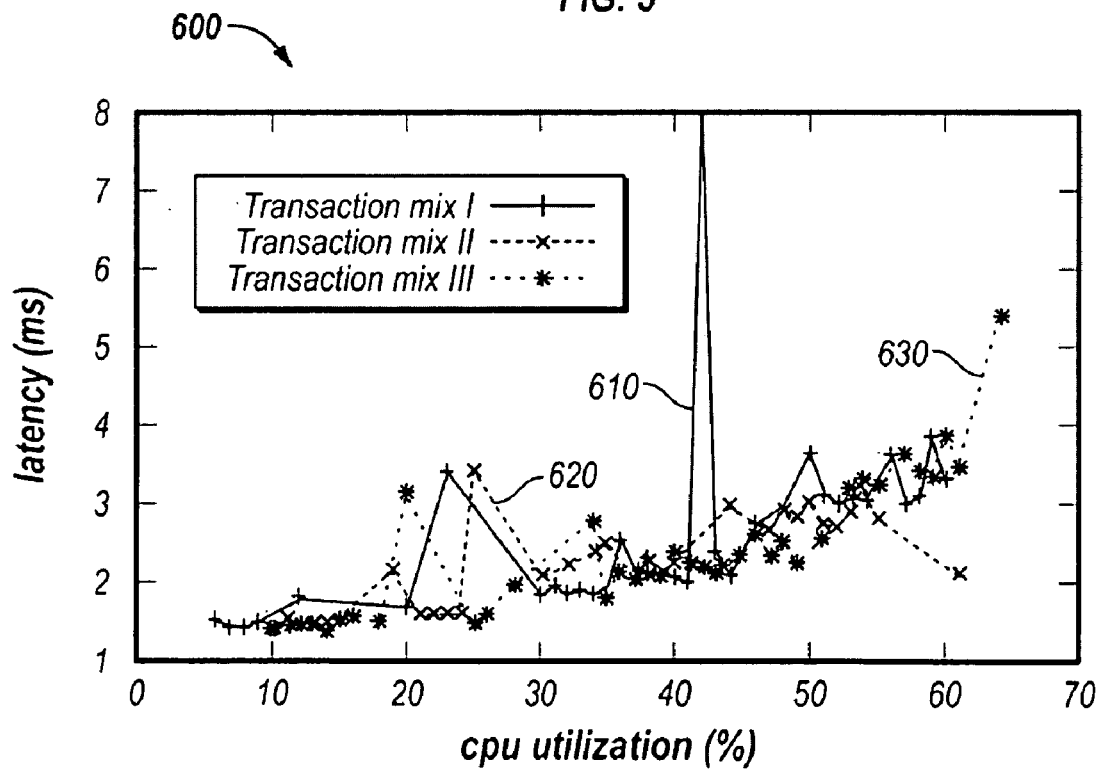
FIG. 6 shows a graph of a shopping cart transaction latency profile for three workloads in accordance with an exemplary embodiment of the present invention.

FIGS. 5 and 6 represent examples of latency profiles for "home" and "shopping cart" transactions for the online retail website. In each figure, three curves are used to correspond to three different workloads. Specifically, FIG. 5 shows a transaction latency profile 500 for the home transaction for a first transaction mix 510, a second transaction mix 520, and a third transaction mix 530. FIG. 6 shows a transaction latency profile 600 for the shopping cart transaction for a first transaction mix 610, a second transaction mix 620, and a third transaction mix 630. In FIGS. 5 and 6, the transaction mixes 510 and 610 are equal; transaction mixes 520 and 620 are equal; and transaction mixes 530 and 630 are equal.

Exemplary embodiments now describe a derivation of transaction service time (transaction CPU demand) that uniquely defines the transaction latency curve. These embodiments can be used for formal comparison of the transaction latency profiles.

A discussion is first directed to queuing theory formulas that help to relate transaction latency, transaction service time, and observed system utilization. As a result, one exemplary embodiment creates a transaction signature that compactly characterizes application transactions under different workload characteristics.

A simple queue system is provided for illustration. Let S be the mean service time for a job in the system, and let Q be the average number of jobs in the system queue at the instant a new job arrives. The residence time (denoted as R) at the queueing center is the sum of the total time spent in service and the total time spent waiting for other jobs to complete service, which are already queued at that center when a job arrives. Thus, the average residence time R in such a system is given by:

$$R=S+S*Q.$$

Note that by assumption, in an open model the queue length seen upon arrival at the queueing center (denoted A) is equal to the time averaged queue length Q. But, in a closed model, an approximation is used as follows:

$$A \approx \frac{N-1}{N}*Q.$$

As N increases, the approximation parameter $$\frac{N-1}{N}$$

approaches 1. Consequently, the queue length seen upon arrival approaches the time averaged queue length Q. By applying Little's law Q=X*R, the following equation results:

$$R=S+S*(X*R),$$

where X is the average system throughput.

Since, by the utilization law the server utilization (denoted as U) is equal to throughput multiplied by service time, i.e., U=X*S, the equation is simplified as follows:

$$R=S+S*((U/S)*R)=S+U*R.$$

Finally, after solving for R, the following form for residence time exists:

$$R=S/(1-U).$$

Next, multiply both sides of the equation by the throughput X to yield:

$$X*R=X*S(1-U).$$

By Little's law, replace Q by XR to yield:

$$Q = \frac{U}{1-U}.$$

This equation illustrates the relationship between the average number of jogs in the system queue and the server utilization.

Now, consider a transaction-based workload executed by a computer system. Let $Tr_1, \ldots, Tr_i$ be different transaction types in the overall system, where $1 \leq i \leq M$. Further, let $S_i$ denote the mean service time of the transaction $Tr_i$ (i.e., the service time for processing $Tr_i$ when it is the only job in the system). Assume an average N jobs (concurrent transactions or customers) in the system.

In one embodiment, computer systems use a time-sharing discipline to service multiple outstanding jobs. Round-Robin (RR) is a close approximation for a time-sharing system. Under the RR, each job in the system receives a fixed quantum of service time. For example, one version of an operating system (OS) used in our experiments operates with one millisecond (ms) time slices. If the job completes within the given quantum, it then leaves the system. Otherwise, this job returns to the end of the queue to wait for the next allotted quantum. When the fixed quantum approaches zero in the limit, the RR policy becomes the same as the processor sharing (PS) policy, where the processor shares its (fixed) capacity equally among all jobs in the system. That is, if there are N jobs in the system, they receive 1/N of their mean service time. Consequently, in such a processor sharing system, the residence time $R_i$ of the transaction $Tr_i$ is given by the following equation:

$$R_i=S_i*N.$$

Since N=Q+1, Q can be replaced to compute a residence time for a concrete transaction type as follows:

$$R_i = S_i*(Q+1)$$
$$= S_i*(U/(1-U)+1)$$
$$= S_i/(1-U).$$

In such a way, for a concrete transaction type $Tr_i$, a relationship exists based on transaction service time $S_i$, transaction residence time $R_i$, and utilization U of the system as follows:

$$S_i=R_i*(1-U).$$

Using this equation, exemplary embodiments approximate the service time $S_i$ and use this service time to fit the latency curves. As such, exemplary embodiments can formally compare the transaction latency profiles under different workload conditions.

One exemplary embodiment creates a representative application performance signature that compactly reflects performance characteristics of the application. One embodiment computes the transaction service times from transaction latency profiles. When measured latencies for each transaction type i over time are collected, multiple equations exist that reflect transaction latencies at different CPU utilization points as shown below:

$$S_i=R_{i,1}^{front}*(1-U_1/100)$$
$$S_i=R_{i,2}^{front}*(1-U_2/100)$$
$$S_i=\ldots.$$

One embodiment finds the solution that is the best fit for the overall equation. A linear regression-based (LSR) method can be chosen to solve for $S_i$. Other methods can be used as well and can consider the following. First, outliers with high values can exist and decrease the accuracy of the final solution because the LSR method aims to minimize the absolute error across the overall set of equations. In such a way, the outliers can impact and skew the solution while these outliers are non-representative points.

An outlier is a deviation (for example, unusual or infrequent events) in samples or portions of the data. For instance, the outliers correspond to some under-represented CPU utilization buckets with few transaction occurrences. As a result, an average transaction latency is not representative for the corresponding CPU utilization bucket. One embodiment creates a more representative latency profile (having less outliers or non-representative buckets) by taking into consideration only the points that constitute 90% of the most populated CPU buckets.

Second, even if the CPU utilization buckets (e.g., top 10 or 20 most populated CPU buckets) are used, then the LSR method also aims to minimize the absolute error since it treats all the equations (i.e. CPU buckets) equally. A significant difference in the number of transactions contributed to different CPU buckets exists and these "additional weights" are not taken into consideration when using the LSR method.

One exemplary embodiment uses a different method (i.e. not the LSR method) to compute the service time $S_i$ for the i-th transaction. By solving $S_i = R_{i,k}^{front} * (1-U_k/100)$, a set of solutions is obtained for different utilization points, $U_k$, in the transaction latency profile. One embodiment generates a Cumulative Distribution Function (CDF) for the $S_i$.

Figure 7:
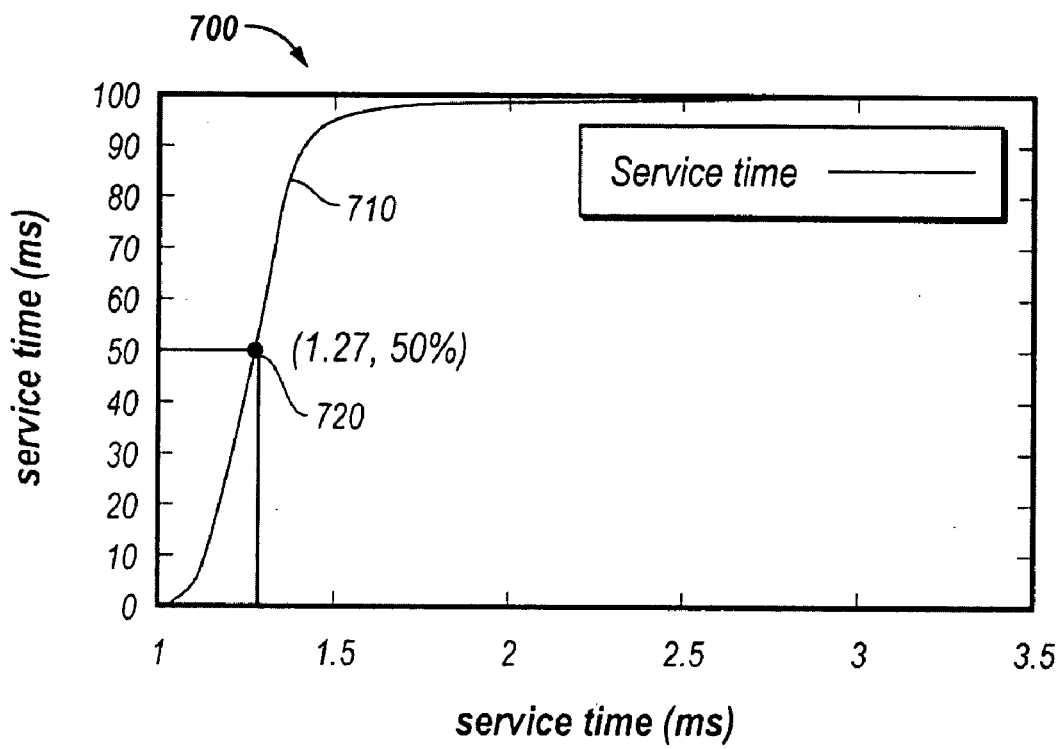
FIG. 7 shows a graph of a Cumulative Distribution Function of the service time for the home transaction in accordance with an exemplary embodiment of the present invention.

For example, FIG. 7 shows a graph 700 of a Cumulative Distribution Function (CDF) of the service time for the home transaction in accordance with an exemplary embodiment of the present invention. Specifically, the figure shows a curve 710 of the CDF of the service time SS for the home transaction. The X-axis shows a measure of the service time in milliseconds (ms), and the Y-axis shows percentage of the CDF Since each transaction type is uniquely characterized by its service time, then one expects a curve similar to FIG. 7 with a large number of similar points in the middle and some outliers in the beginning and the tail of the curve. One embodiment selects the 50-th percentile value as the solution for $S_i$ (shown at 720 with a value of 1.27). The 50-th percentile heuristic works well for a variety of transactions.

One embodiment then creates an application performance signature as follows:

$$Tr_1 \rightarrow S_1$$

$$Tr_2 \rightarrow S_2$$

$$Tr_n \rightarrow S_n.$$

This application performance signature uniquely reflects the application transactions and their CPU requirements. Furthermore, this application performance signature is invariant for different workload types and compactly represents a model of "normal" application behavior. Comparing a new application signature against an old one allows detection of specific application performance changes and provides analysis of their impacts.

One exemplary embodiment was executed under three different workloads. Each execution is performed for three hours, and transaction data and performance metrics are collected using the diagnostics tool.

Figure 8:
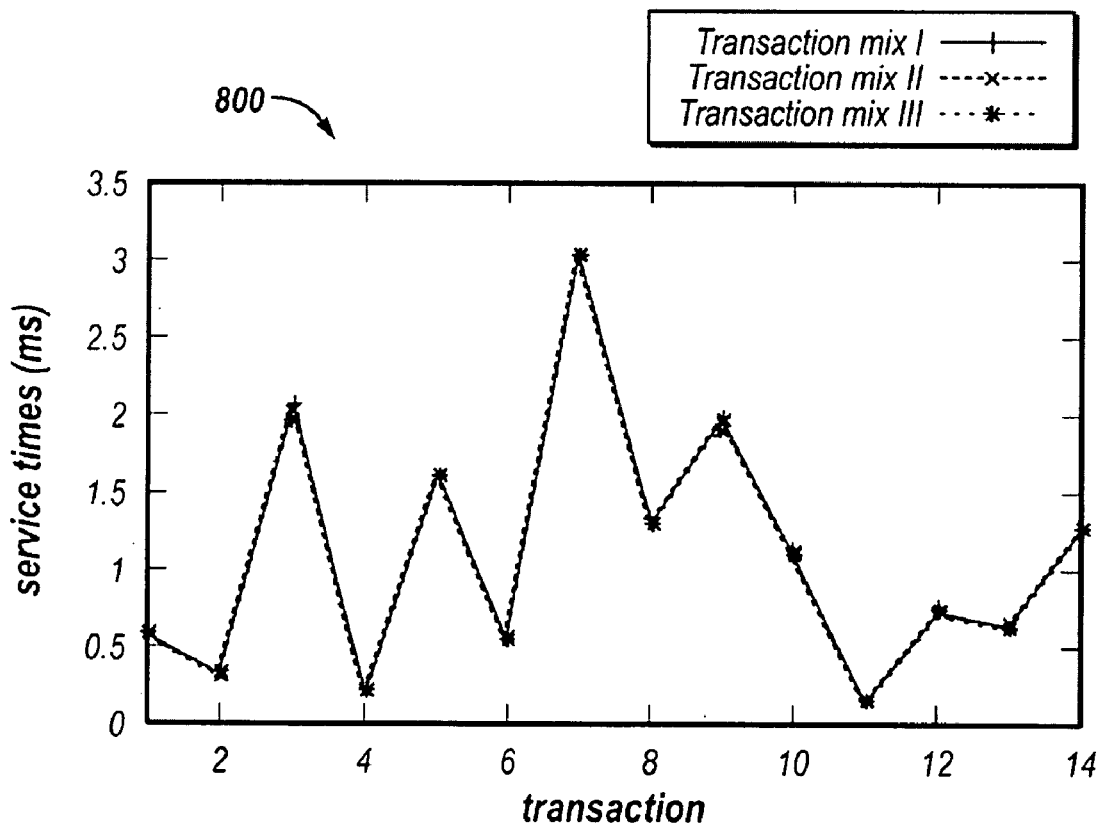
FIG. 8 shows a graph of transaction service times under three workloads in accordance with an exemplary embodiment of the present invention.

FIG. 8 shows a graph 800 of transaction service times under three workloads in accordance with an exemplary embodiment of the present invention. Specifically, the figure plots the three application signatures under different workloads (namely, transaction mix I, transaction mix II, and transaction mix III). Here, the X-axis represents the transaction number, while the Y-axis represents the estimated service time of transactions. As shown, the application signatures are practically identical under different workload mixes and, as such, can be used as a compact performance model of the application behavior.

In order to determine whether an application signature reflects the application change, one embodiment modified the source code of the home transaction. This embodiment increased the transaction execution time by inserting a controlled CPU-hungry loop into the code of the transaction.

Figure 9:
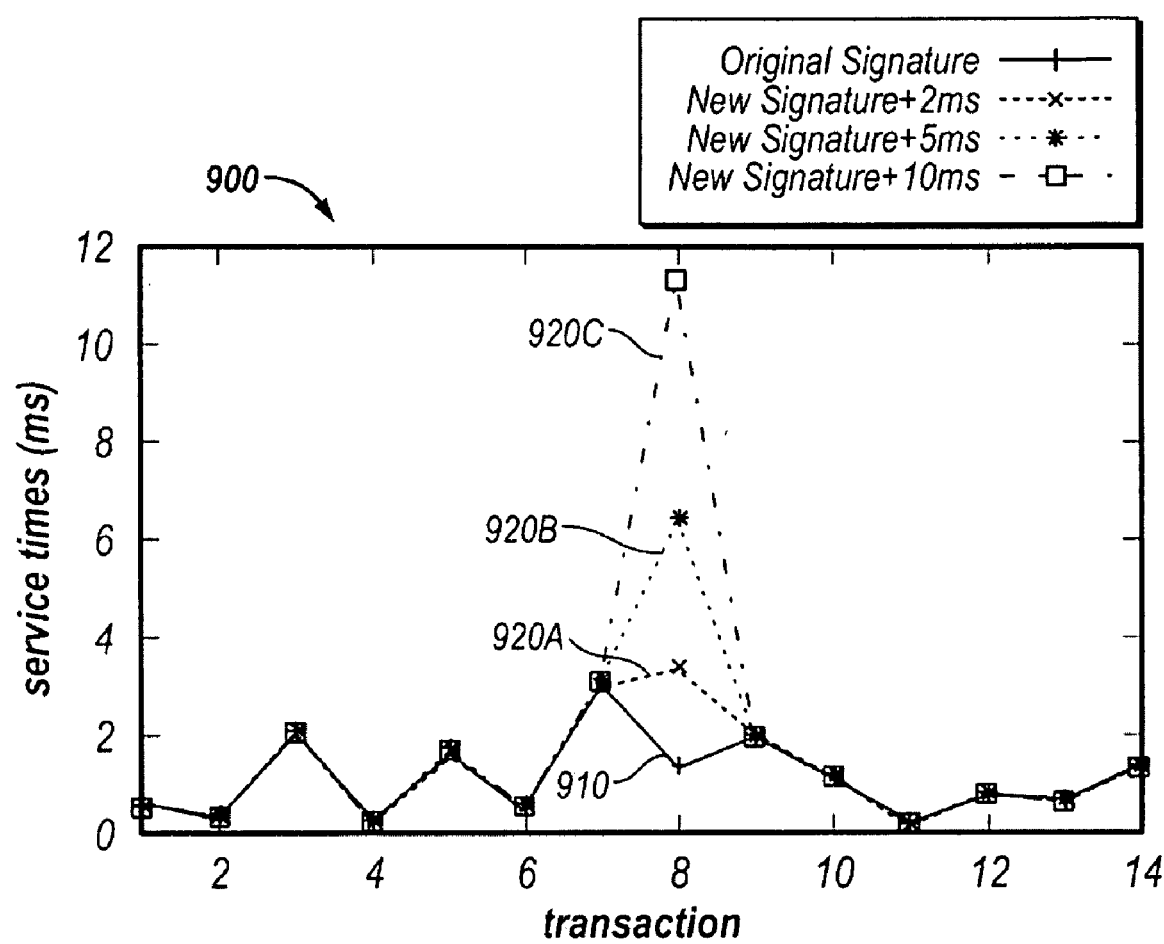
FIG. 9 shows a graph of an original application performance signature versus the application performance signature after the application is modified in accordance with an exemplary embodiment of the present invention.

FIG. 9 shows a graph 900 of an original application performance signature 910 versus multiple application performance signatures (920A, 920B, and 920C) after the application is modified in accordance with an exemplary embodiment of the present invention. Specifically, the figure shows the application signature of a modified application where the original application signature is plotted as the base line. Here, three additional experiments are performed with differently modified versions of the service time of the home transaction. Specifically, the service time of the $8^{th}$ transaction is increased (i) by 2 milliseconds (resulting in a first new application performance signature 920A), (ii) by 5 milliseconds (resulting in a second new application performance signature 920B), and (iii) by 10 milliseconds (resulting in a third new application performance signature 920C).

Thus, exemplary embodiments compare a new application signature against the original application signature to detect the application performance changes related to the original application. This application signature method enables a quick verification of the possible performance changes in the application behavior between updates while the application continues to execute in the production environment.

Figure 10:
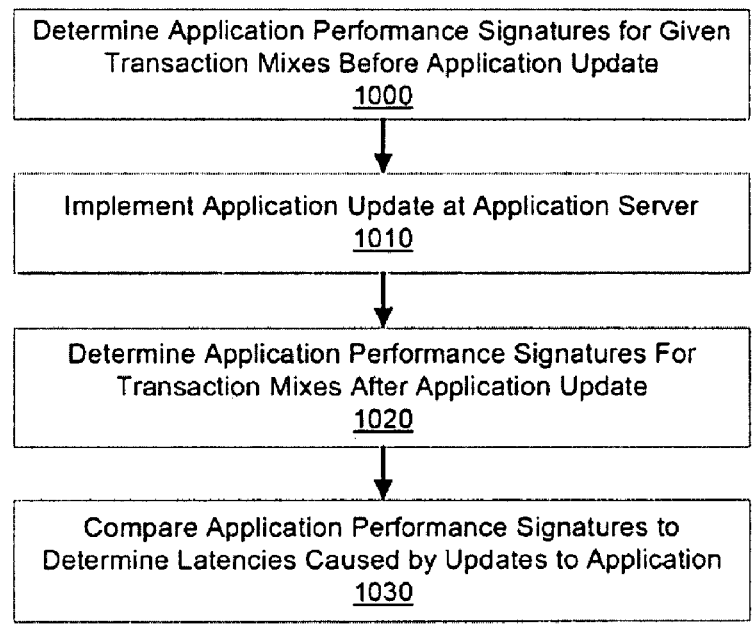
FIG. 10 shows a flow diagram for comparing multiple application performance signatures after an update to an application in accordance with an exemplary embodiment of the present invention.

FIG. 10 is a flow diagram for comparing transaction latency profiles before and after an application update in accordance with an exemplary embodiment of the present invention.

According to block 1000, application performance signatures are calculated before the application is updated at the application server. For example, application performance signatures (such as those shown in FIG. 8) are calculated for the home and shopping cart transactions.

According to block 1010, the application at the application server is updated or modified.

According to block 1020, application performance signatures are calculated after the application is updated at the application server. In other words, after the modified application is installed and executing at the application server, the application performance signatures are again calculated for the same workloads or transaction mixes.

According to block 1030, a comparison is performed between the application performance signatures before the application is updated and the application performance signatures after the application is updated. This comparison reveals the latencies that are caused by the updates to the application (as opposed to latencies caused by a change in load).

Indeed, comparing a new application performance signature against the original application performance signature allows detection of the application performance changes related to the transaction. The application performance signature enables a quick check of the possible performance changes in the application behavior between updates while the application continues its execution in the production environment. By way of example, the application performance signatures can be output to a computer display, provided to a computer for storing or processing, provided to a user, etc.

Figure 11:
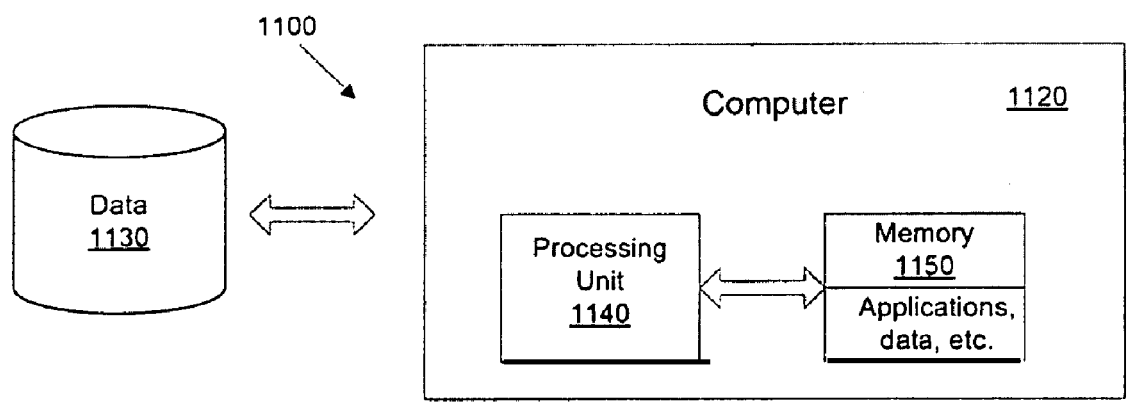
FIG. 11 is an exemplary computer system in accordance with an exemplary embodiment of the present invention.

Embodiments in accordance with the present invention are utilized in or include a variety of systems, methods, and apparatus. FIG. 11 illustrates an exemplary embodiment as a computer system 1100 for being or utilizing one or more of the computers, methods, flow diagrams and/or aspects of exemplary embodiments in accordance with the present invention.

The system 1100 includes a computer system 1120 (such as a host or client computer) and a repository, warehouse, or database 1130. The computer system 1120 comprises a processing unit 1140 (such as one or more processors of central processing units, CPUs) for controlling the overall operation of memory 1150 (such as random access memory (RAM) for temporary data storage and read only memory (ROM) for permanent data storage). The memory 1150, for example, stores applications, data, control programs, algorithms (including diagrams and methods discussed herein), and other data associated with the computer system 1120. The processing unit 1140 communicates with memory 1150 and data base 1130 and many other components via buses, networks, etc.

Embodiments in accordance with the present invention are not limited to any particular type or number of databases and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in flow diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    calculating a first application performance signature for an application at an application server;
    calculating a second application performance signature for the application at the application server after providing an update to the application, wherein the first and second application performance signatures are computed from a service time for transaction requests from a client computer;
    processing the first and second application performance signatures on a processor-based machine to compare the first and second application performance signatures to determine whether a change in transaction performance at the application server results from the update; and
    providing results of the change to a user.

2. The method of claim 1 further comprising, simultaneously plotting the first and second application performance signatures on a graph to show whether the change in transaction performance at the application server results from the update.

3. The method of claim 1 further comprising, plotting the first and second application performance signatures on a graph having one axis as transaction number and a second axis as service time of transactions.

4. The method of claim 1 further comprising, measuring transaction latencies for wailing times and service times at both the application server and a database server.

5. The method of claim 1 further comprising, wherein the service time is a function of a residence time for a transaction and a throughput of transactions processed at the application server.

6. The method of claim 1 further comprising, classifying observed transactions at the application server into Central Processing Unit (CPU) buckets for each of plural different monitoring windows of time.

7. The method of claim 1 further comprising, computing transaction latencies at different Central Processing Unit (CPU) utilizations for different types of transactions requested by the client computer.

8. A tangible computer readable storage medium having instructions for causing a computer to execute a method, comprising:
    determining application performance signatures occurring at an application server in a multi-tier architecture, the application performance signatures being a function of transaction processing time, transaction latency, and server utilization;
    analyzing the application performance signatures to determine whether a change in transaction performance at the application server results from a modification to an application; and
    outputting analysis of the change.

9. The tangible computer readable storage medium of claim 8 further comprising, plotting the application performance signatures to determine whether the change in transaction performance at the application server results from the modification to the application.

10. The tangible computer readable storage medium of claim 8 further comprising, removing outliers from the application performance signatures at the application server to remove CPU utilization that is under-represented.

11. The tangible computer readable storage medium of claim 8 further comprising, simultaneously comparing on a graph a first application performance signature calculated before the modification to a second application performance signature calculated after the modification.

12. The tangible computer readable storage medium of claim 8, wherein the application performance signatures are a function of service time and residence time for transactions at the application server.

13. The tangible computer readable storage medium of claim 8 further comprising, plotting on a single graph the application performance signatures occurring at the application server for plural different workload mixes.

14. The tangible computer readable storage medium of claim 8 further comprising, determining whether a change in transaction execution time at the application server results from an increase in workload or the modification.

15. The tangible computer readable storage medium of claim 8, wherein the transaction processing time (S) is based on the transaction latency (R) and the server utilization (U) as follows: $S=R*(1-U)$.

16. A computer system, comprising:
a memory for storing an algorithm; and
a processor for executing the algorithm to:
determine application performance signatures occurring at an application server in a multi-tier architecture, the application performance signatures being a function of transaction processing time, transaction latency, and server utilization;
analyze the application performance signatures during a monitoring window to determine whether a change in transaction performance at the application server results from a modification to an application.

17. The computer system of claim 16, wherein the processor further executes the algorithm to plot the application performance signatures of the application server to visually show whether the change in the transaction performance results from the update to the application or changes in transaction workload occurring at the application server.

18. The computer system of claim 16, wherein the processor further executes the algorithm to compute transaction latencies at different Central Processing Unit (CPU) utilizations for different types of transactions received at the application server from a client computer.

19. The computer system of claim 16, wherein the processor further executes the algorithm to remove outliers from the application performance signatures at the application server to remove Central Processing Unit (CPU) utilization that is under-represented.

20. The computer system of claim 16, wherein the processor further executes the algorithm to determine whether the change in transaction performance results from an increase in load in the multi-tier architecture.

* * * * *